United States Patent [19]

Lammers

[11] Patent Number: 4,932,496

[45] Date of Patent: Jun. 12, 1990

[54] SELF-SUPPORTING SOUND BARRIER

[75] Inventor: Bryan G. Lammers, Washington, Ill.

[73] Assignee: Caterpillar Inc., Peoria, Ill.

[21] Appl. No.: 361,193

[22] Filed: Jun. 5, 1989

[51] Int. Cl.$^5$ .............................................. E04B 1/82
[52] U.S. Cl. .................................. 181/290; 181/291; 181/294; 296/39.3; 296/211
[58] Field of Search ................................ 181/290–294; 296/39.3, 190, 211, 218

[56] References Cited

U.S. PATENT DOCUMENTS

| | | | |
|---|---|---|---|
| 3,829,150 | 8/1974 | Moore | 296/39.3 |
| 3,881,769 | 5/1975 | Metzke | 296/190 |
| 3,948,347 | 4/1976 | Rutledge | 181/291 |
| 4,045,076 | 8/1977 | Day, Sr. et al. | 296/39.3 |
| 4,069,738 | 1/1978 | McClure | 411/34 |
| 4,084,366 | 4/1978 | Saylor et al. | 52/794 |
| 4,097,085 | 6/1978 | Nelson | 296/190 |
| 4,456,092 | 6/1984 | Kubozuka et al. | 181/290 |
| 4,706,422 | 11/1987 | Ashton | 181/291 X |
| 4,832,152 | 5/1989 | Schuelke et al. | 181/290 |

Primary Examiner—Benjamin R. Fuller
Attorney, Agent, or Firm—Claude F. White

[57] ABSTRACT

A self-supporting sound barrier for the operator's cover of a construction type vehicle is supported within the operator's cover at the perimeter of the sound barrier only and is self-supporting throughout the major surface area of the sound barrier. The sound barrier has strengthening and supporting materials, such as a grid structure or oriented fibers, throughout the main body of the sound barrier which lengthen during sagging of the sound barrier. As the grid sturcture lengthens, it contacts portions of the operator's cover and the sound barrier is restrained from further sagging. Prior art sound barries utilize an elaborate system of parts and assembly procedures to secure a sound barrier in place within an operator's cover. The subject self-supporting sound barrier is simple to manufacture and is easy to install and/or remove from an operator's cover.

11 Claims, 3 Drawing Sheets

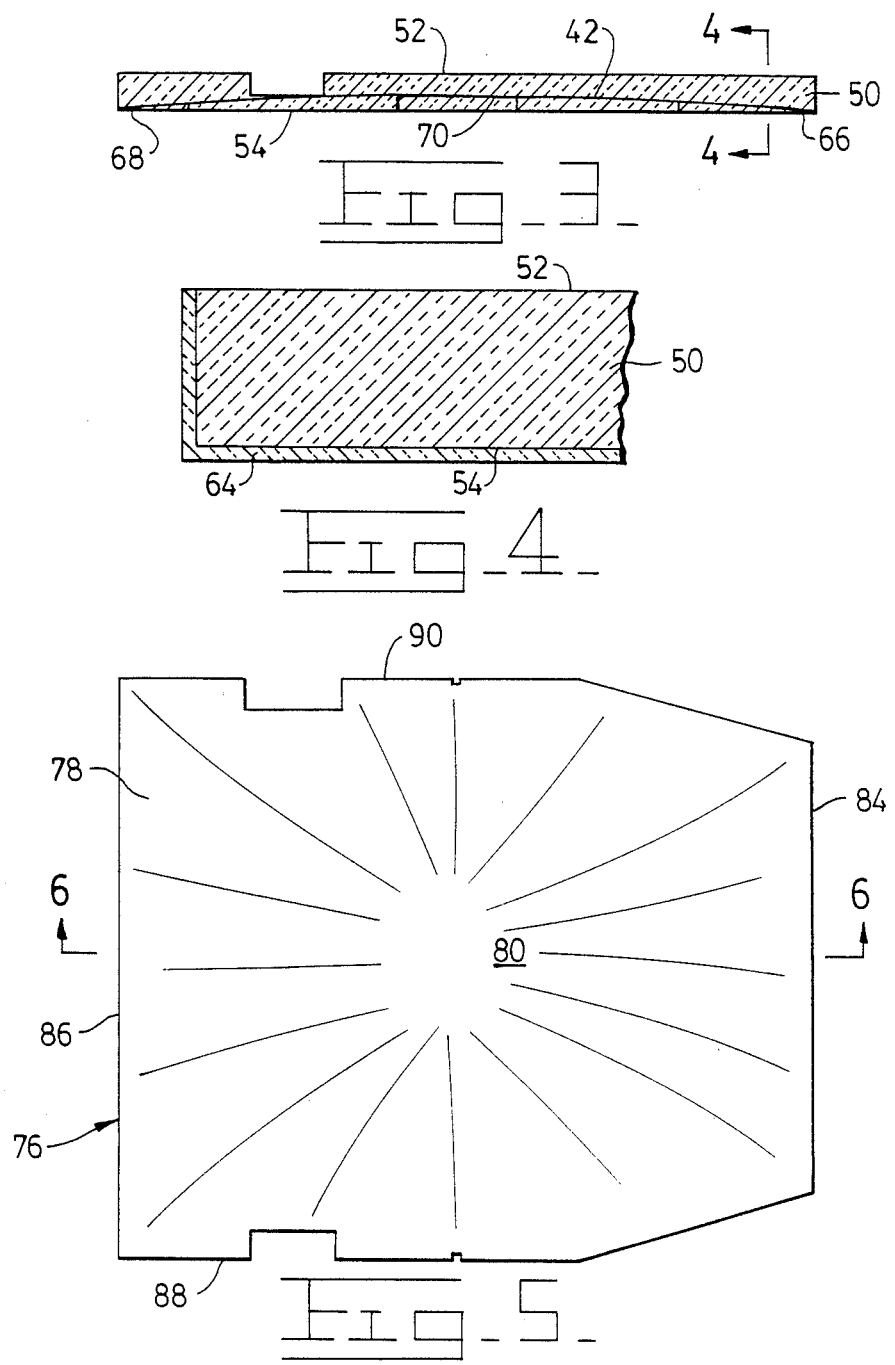

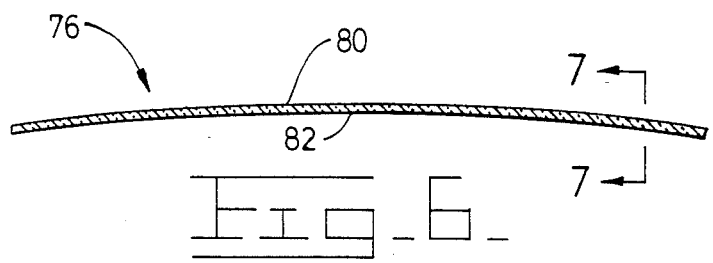
Fig_6_
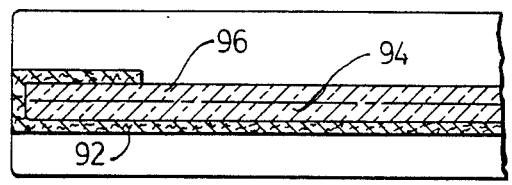
Fig_7_
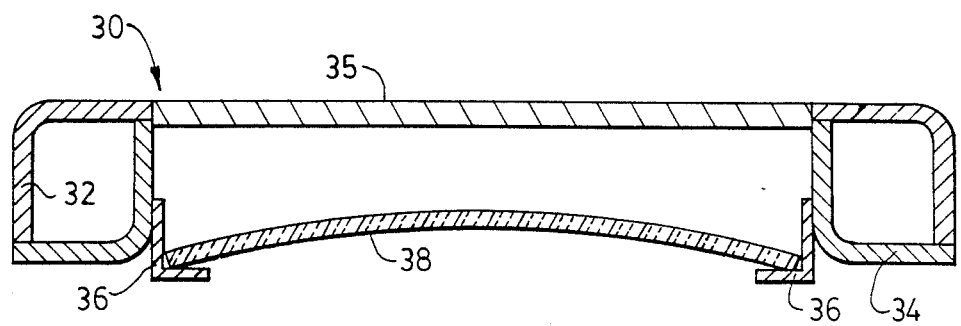
Fig_8_

4,932,496

SELF-SUPPORTING SOUND BARRIER

TECHNICAL FIELD

This invention relates generally to a sound barrier for the operator's cover of a vehicle and more particularly to a sound barrier which is self-supporting throughout the major surface area of the sound barrier.

BACKGROUND ART

Earthmoving and construction vehicles, especially self-laying track-type vehicles, generate considerable noise during traveling and operation of the vehicle. Such noise is not only objectionable to nearby workers and spectators, but is especially bothersome to the vehicle operator. The vehicle operator is closest to the noise and generally operates the vehicle many hours a day. Any reduction in the vehicle noise reaching the operator will help reduce operator fatigue, which will make the operator more alert and productive. One way to reduce the noise level reaching the vehicle operator is to install a sound barrier in the overhead cover of the operator's station. Various types of sound barriers have been used in the past, and various means have been utilized to fasten the barriers to the overhead cover.

One type of barrier is described in U.S. Pat. No. 4,097,085, issued June 27, 1978, to A. E. Nelson. The dome-shaped barrier described in this patent has an upper support portion of rigid construction, such as fiberboard, and a lower sound absorbing portion, such as carpeting. A plurality of holes are drilled through both the upper and lower portions. These holes allow the air from the air conditioner to enter the interior of the cab. The exact details of how the barrier is secured in place are not disclosed. Although this barrier would appear to distribute the air from the air conditioner into the cab interior, it would seem to have poor sound-barrier qualities because of the many through holes.

U.S. Pat. No. 4,069,738, issued Jan. 24, 1978, to R. D. McClure discloses an insulation retainer and a method of securing insulating material against a plate using the retainer. The method of retaining the insulating material in place includes a plurality of holes through the plate, such holes being filled with a deformable plug. Each plug holds a pointed stud which extends out of the plug. The insulating material is pushed over the plurality of studs, such studs piercing the insulating material. A protective cap is then fitted over each of the projecting studs to firmly hold the insulating material in place. Although this retainer method is typical of prior art practices for retaining insulation and sound barriers in earthmoving and construction vehicles, it does require considerable time, materials, and effort.

The present invention is directed to overcoming one or more of the problems as set forth above.

DISCLOSURE OF THE INVENTION

In one aspect of the present invention, a self-supporting sound barrier for the overhead cover of the operator's station of a vehicle includes a grid structure having a plurality of rigid spaced-apart first and second ribs, with the second ribs crossing the first ribs. The sound barrier further includes a plurality of support members positioned at the perimeter of the grid, a layer of foam insulation encapsulating the grid and support members, and a protective covering enclosing the foam insulation.

Earthmoving and construction vehicles, which utilize self-laying steel track assemblies for support and propulsion, generally produce a considerable amount of noise during travel and work operations. It is advantageous to isolate the vehicle operator from as much of this noise as possible. To accomplish this, many of these vehicles are equipped with enclosed operator's stations with sound insulating materials added to the top and sides of these enclosures. Many other of these vehicles are equipped with only a canopy or overhead cover for the operator's station. It has been the practice to provide a sound barrier on the underside of these overhead covers also since these covers can transmit much of the machine noise to the operator. Rather elaborate fastening means have been used in the past to secure the sound barriers in place in the overhead covers or the operator enclosures. These prior art fastening means required considerable piece parts, considerable time and effort to install them, and high production costs.

The subject self-supporting sound barrier provides a solution to the above problems by eliminating most of the prior art fastening parts. Installation or removal of the subject self-supporting sound barrier requires very little time or effort, yet it is securely held in place and is an effective sound barrier.

BRIEF DESCRIPTION OF THE DRAWINGS

FIG. 3 is a diagrammatic sectional view of the subject sound barrier, taken generally along lines III—III of FIG. 2;

FIG. 4 is a diagrammatic sectional view, on an enlarged scale, taken generally along lines IV—IV of FIG. 3;

FIG. 5 is a diagrammatic plan view of an alternate embodiment of the subject invention;

FIG. 6 is a diagrammatic sectional view, taken generally along lines VI—VI of FIG. 5;

FIG. 7 is a diagrammatic sectional view, on an enlarged scale, taken generally along lines VII—VII of FIG. 6; and FIG. 8 is a diagrammatic sectional view, on an enlarged scale, taken generally along lines VIII—VIII of FIG. 1.

BEST MODE FOR CARRYING OUT THE INVENTION

Figure 1:
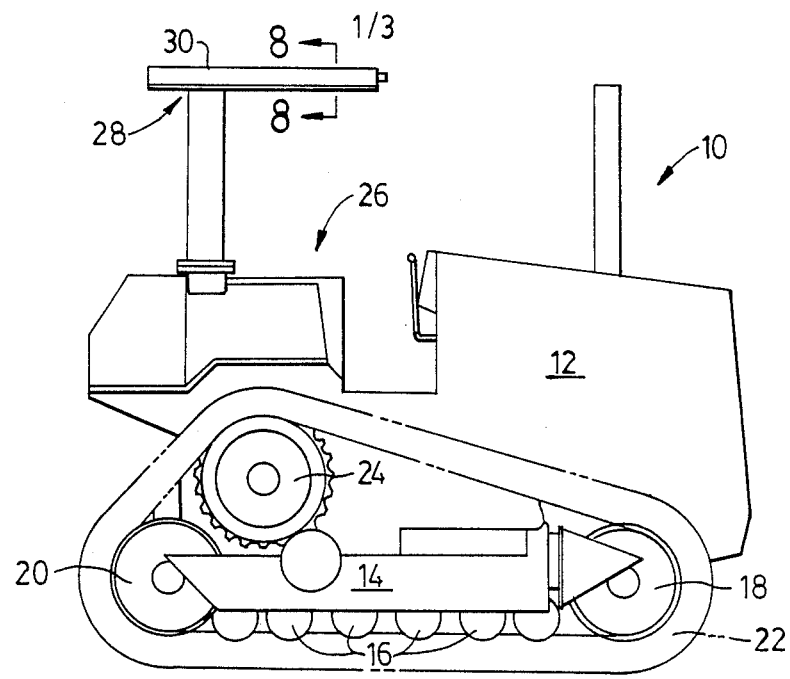
FIG. 1 is a diagrammatic side elevational view of a track-type vehicle incorporating a sound barrier of the present invention.
Figure 2:
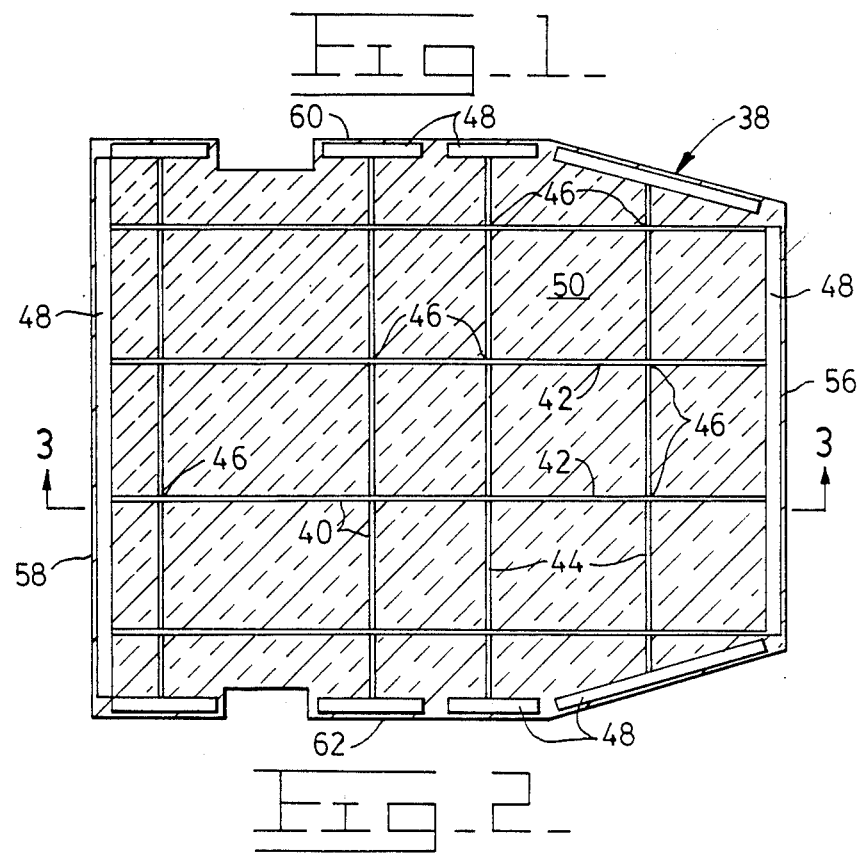
FIG. 2 is a diagrammatic plan view of the sound barrier of the present invention, partially in section to show details of the structure.

With reference to the drawings, a track-type vehicle 10 has an engine 12, a track roller frame 14, a plurality of guide rollers 16, first and second idler wheels 18,20, an endless track assembly 22, and a sprocket wheel 24 for transferring the power from the engine 12 to the track assembly 22. The vehicle also has an operator's station 26 and an overhead cover assembly 28 for covering the operator's station 26. The cover assembly 28 includes a rigid frame structure 30 having first and second spaced apart parallel beams 32,34 a plate member 35 joining the beams 32,34, and a plurality small L-shaped supporting brackets 36 which are secured to the beams 32,34.

A self-supporting sound barrier 38 is positioned between the first and second beams 32,34 and beneath the plate member 35. The sound barrier 38 includes an interconnected grid structure 40 having a plurality of rigid spaced-apart substantially parallel first ribs 42 and a plurality of rigid spaced-apart substantially parallel second ribs 44. The second ribs 44 cross the first ribs 42 and form substantially a right angle with each of the first ribs 42 at each cross juncture 46. Preferably, each of the first ribs 42 is secured to each of the second ribs 44 at each of the cross junctures 46. A plurality of support members 48 are positioned at the perimeter of the grid 40 and are preferably secured to selected ones of the first and second ribs 42,44. A formed body portion 50 of sound insulating material surrounds and encapsulates the grid structure 40 and the support members 48. Several different materials may be used for the insulating material, but an open cell foam material, which can be injected around the grid 40 and the support members 48, is preferred.

The body portion 50 has upper and lower surfaces 52,54, a front edge 56, a rear edge 58, and first and second side edges 60,62. A protective wrap, or covering 64, encloses the front and rear edges 56,58, the first and second side edges 60,62 and the lower surface 54. If desirable, the protective wrap 64 can also cover a portion of the upper surface 52. The protective wrap 64 is preferably a plastic material or a synthetic fibrous material, such as carpeting.

The first and second ribs 42,44 of the grid structure 40 and the support members 48 can be formed of metal or plastic and can be rectangular or round in cross-section. Although the ribs 42,44 are rigid, they are also flexible along their longitudinal axes. As best shown by referring to FIG. 3, each of the first ribs 42 has a first end portion 66, a second end portion 68, and a center portion 70. The first and second end portions 66,68 are substantially planar with the lower surface 54 of the body portion 50 while the center portion 70 is spaced from the lower surface 54. This is accomplished by flexing the grid 4 and maintaining it in the flexed position while the foam insulating material is injected around the grid 40. Once the insulating material has hardened the grid 40 Will hold its flexed shape.

With particular reference to FIGS. 5, 6, and 7, an alternate embodiment of a self-supporting sound barrier 76 is illustrated. The sound barrier 76 includes a formed body portion 78 of a sound insulating material. The body portion 78 has the general, shape in plan of the overhead operator cover 28 and a dome shape in cross-section. The body portion 78 further has a top surface 80, a bottom surface 82, front and rear edges 84,86, and first and second side edges 88,90. A synthetic fibrous material wrap 92, such as carpeting, encloses the bottom surface 82, the front and rear edges 84,86, the first and second side edges 88,90, and a portion of the top surface 80. The fibrous material wrap 92 is preferably bonded to the top and bottom surfaces 80,82. The body portion is preferably a fiberglass material and includes a first layer 94 of "S" type fiberglass adjacent the bottom surface 82 and a second layer 96 of "T" type fiberglass adjacent the top surface 80. The two layers 94 and 96 are bonded together, and together have a density in the range of 10 to 18 lbs. per cubic foot. The first layer 94 of "S" type fiberglass provides good sound absorbing qualities and the second layer 96 of "T" type fiberglass provides strength to maintain the dome shape to the sound barrier 76.

INDUSTRIAL APPLICABILITY

With reference to the drawings, the subject self-supporting sound barriers 38,76 are particularly useful with earthmoving and construction vehicles, such as vehicle 10. The engine 12 and the track assembly 22, as well as other vehicle implements such as a bulldozer and ripper (not shown), generate considerable noise during traveling and operation of the vehicle 10. The overhead cover 28 can act as a sounding board for these noises and magnify them somewhat. The subject sound barriers 38,76, secured within the overhead cover 28 absorb much of the noise and reduce the amount of noise reaching the vehicle operator.

The sound barriers 38,76 are pre-formed prior to installation in the overhead cover 28. To install the sound barriers 38,76, the barrier is flexed or bent by hand and placed in the overhead cover 28 so the first and second side edge portions 60,62,88,90 are above the brackets 36. As the barrier is released, it snaps into place with the first and second side edge portions 60,62,88,90 in contact with the upper legs of the brackets 36 and supported by the lower legs of the brackets 36. The sound barriers 38,76 will maintain the dome shape as shown in FIG. 8. The sound barriers 38,76 are supported only at the perimeter by the brackets 36. If the sound barriers 38,76 should tend to sag or droop through the center portion, the ribs 42.44 will become longer, due to their upwardly flexed shape, and contact the brackets 36 to prevent any further downward movement of the sound barrier. The sound barriers 38,76 can be easily removed by flexing the barrier 38,76 and releasing them from the brackets 36.

An alternate method of installing the sound barriers 38,76 within the overhead cover 28 would involve removing one or more of the brackets 36 and sliding the barriers 38,76 into place from one end of the overhead cover 28. The removed brackets 36 are then refastened to the overhead cover 28. With this method, the barriers 38,76 need to be flexed to a lesser degree. To remove the barriers 38,76 one or more of the brackets 36 are removed and the barriers 38,76 are slid out one end of the overhead cover 28.

Other aspects, objects and advantages of this invention can be obtained from a study of the drawings, the disclosure, and the appended claims.

I claim:

1. A self-supporting sound barrier for a vehicle, comprising:

a grid structure having an outer perimeter and a plurality of rigid spaced-apart substantially parallel first ribs and a plurality of rigid spaced-apart substantially parallel second ribs, said second ribs crossing said first ribs, each of said second ribs forming substantially a right angle with each of said first ribs at each cross junction;

a plurality of support members positioned at the perimeter of said grid structure;

a body portion of foam insulation having a lower surface, a front edge, a rear edge, and first and second side edges, said foam insulation surrounding and encapsulating said grid structure and said support members; and a protective covering enclosing said front and rear edges, said first and second side edges, and said lower surface.

2. The sound barrier, as set forth in claim 1, wherein said first and second ribs of said grid structure and said support members are rectangular in cross-section and are formed of metal.

3. The sound barrier, as set forth in claim 1, wherein said first and second ribs of said grid structure and said support members are formed of a plastic material.

4. The sound barrier, as set forth in claim 1, wherein each of said first ribs is secured to each of said second ribs at each cross juncture.

5. The sound barrier, as set forth in claim 1, wherein each of said support members is secured to at least one of said first and second ribs.

6. The sound barrier, as set forth in claim 1, wherein said protective covering is a plastic material.

7. The sound barrier, as set forth in claim 1, wherein said protective covering is a synthetic fibrous material.

8. The sound barrier, as set forth in claim 1, wherein each of said first ribs has a first end portion, a second end portion, and a center portion, said first and second end portions being substantially planar with said lower surface and said center portion being spaced from said lower surface.

9. A sound barrier for an overhead operator cover of a vehicle, said operator cover having a generally rectangular configuration in plan view comprising:
   a formed body portion of sound insulating material having a top surface, a bottom surface, front and rear edges, and first and second side edges, said body portion having a general configuration in plan view of said operator cover configuration and a dome shape in cross-section, said body portion including a first layer of fiberglass material adjacent said bottom surface and a second layer of fiberglass material adjacent said top surface, said first layer characterized mainly as a sound absorbing layer and said second layer characterized mainly as a strengthening layer, said first and second layers being bonded together and having a combined density in a range of 10 to 18 lbs. per cubic foot; and
   a synthetic fibrous material wrap enclosing said bottom surface, said front and rear edges, said first and second side edges, and a portion of said top surface.

10. The sound barrier, as set forth in claim 9, wherein said fibrous material wrap is bonded to said top and bottom surfaces.

11. An overhead cover assembly for a vehicle, comprising:
   a rigid frame structure having first and second spaced apart beams, a plate member joining said first and second beams, and a plurality of supporting brackets secured to said first and second beams; and
   a sound barrier positioned between said first and second beams and beneath said plate member, said sound barrier having first and second side edge portions and including a plurality of first and second ribs forming an interconnected grid structure, a body portion of sound insulating material surrounding and encapsulating said grid structure, and a protective wrap enclosing said body portion, said first and second side edge portions being supported by said supporting brackets.

* * * * *